Sept. 2, 1958     J. E. SVABEK, JR., ET AL     2,850,034
VACUUM BREAKER VALVE
Filed Aug. 24, 1953
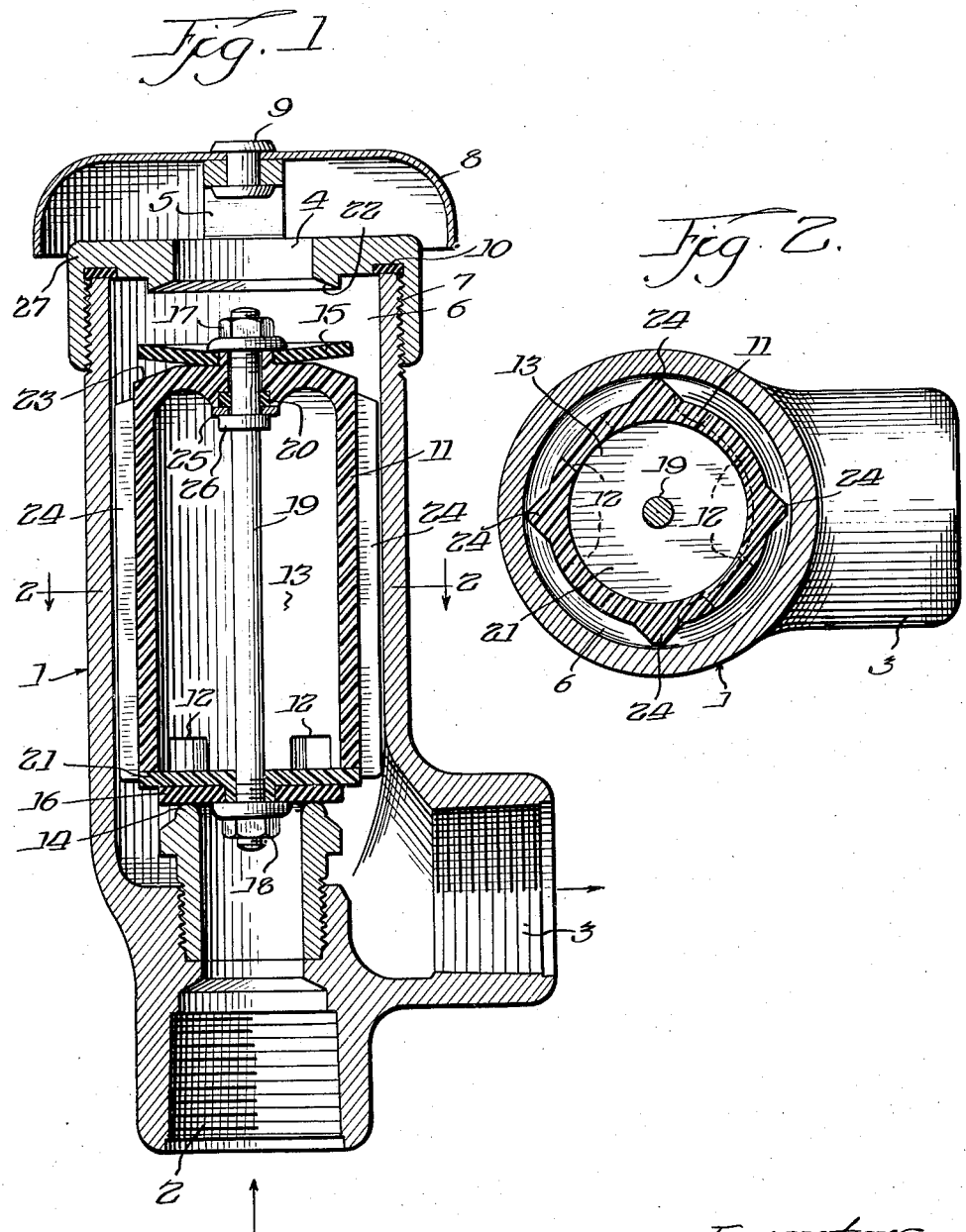

United States Patent Office 2,850,034
Patented Sept. 2, 1958

2,850,034

VACUUM BREAKER VALVE

John E. Svabek, Jr., Chicago, and Edward G. Schmidt, La Grange, Ill., assignors to Crane Co., Chicago, Ill., a corporation of Illinois Application August 24, 1953, Serial No. 376,034

3 Claims. (Cl. 137—218)

The present invention pertains to a vacuum breaker valve known to those skilled in the art as a float-type backflow preventer.

Proper functioning of valves of this type is extremely important since the health of the individuals employing such valves in their plumbing systems is directly dependent thereon, realizing that backflow might otherwise lead to dangerous contamination and pollution.

Vacuum breaker valves prevent back flow or back-siphonage of water from the various plumbing fixtures found in the home or elsewhere into the fresh water supply lines. Water if back-siphoned is usually contaminated and may easily spread disease of epidemic proportions before the source of the trouble is located. Causes of back-siphonage are very numerous in the ordinary plumbing system, and therefore must be guarded against as an ever-present threat to good health.

Contamination may readily occur in a fresh water supply line to which a number of plumbing fixtures are attached. A large volume of fluid flow through any outlet in the system will create a vacuum or aspirator effect. Contaminated water from other plumbing fixtures in the line will be siphoned into the fresh water system in an effort to satisfy the existing vacuum thereby frequently polluting the entire system.

Heretofore in vacuum breakers of the float type construction, the fluid sealing closure between the air vent and float member was inefficiently effected at low rates of flow. This inability to provide an adequate liquid seal resulted in vent leakage or "spitting" when the liquid flow fell below a critical rate which in turn was the determinant of the critical pressure necessary to maintain the float sealing disc and atmospheric vent seat in a proper fluid-sealing relationship.

It is, therefore, a main object of our invention to provide a vacuum breaker employing a float valve designed to prevent vent leakage even at extremely low rates of flow.

It is a further object of our invention to provide a design in which the atmospheric valve seat and the cooperating disc supporting structure permit the area of the sealing contact being directly proportional to the ordinary rates of fluid flow, thus assuring a fluid-tight seal at high as well as low pressures.

It is a still further object of the present invention to provide a valve design wherein the ability of the resilient disc to flex under increased fluid pressures is utilized in clearing the valve seat surfaces of any foreign matter detrimental to good sealing, which wiping action will hereafter be described in greater detail.

Although the prior art reveals valve constructions employing flexible sealing discs which effect a sliding action with their respective seats, no construction reveals the firm surface contact between disc and seat found in our invention. In the present invention, a flexible disc is forced to conform to a rigid seating surface of frusto-conical configuration upon being impelled by a frusto-conical driving head of a float member having substantially the same configuration as the recessed portion of the seating surface. The float head and valve seat are thus socketed with an interposed resilient sealing disc, assuring a fluid-tight seal of an improved type heretofore unknown to the art.

Other objects and advantages embodied in the subject matter to be disclosed will become more manifest upon proceeding with the specification read in the light of the accompanying detailed drawings, in which:

Fig. 1 is a sectional assembly view of a vacuum breaker embodying our invention.

Fig. 2 is a sectional view taken on line 2—2 of Fig. 1.

Similar reference characters refer to similar parts throughout the several views.

Referring now to Fig. 1, the usual body or casing 1 is shown with a liquid inlet 2 and outlet 3. The bonnet 27 contains vent passage 4 which is ported at 5 for the admission of air to the main valve chamber 6. Although the vent bonnet passage 27 is depicted as being connected to the casing 1 by means of the threads 7, it is, of course, obvious that other suitable connecting means may be employed or the two pieces made integral if so desired. The vent cap 8 is connected to the bonnet 27 containing vent passage 4 by means of the rivet 9 or other suitable means of attachment, and the connection between the air vent and casing is rendered fluid tight by means of the gasket 10.

The float member 11 is preferably of light-weight durable plastic and has annularly disposed guide ribs 24 more clearly seen in Fig. 2. The danger of the float 11 becoming waterlogged and unresponsive to changes in pressure is obviated by means of the ports 12. Water which may find its way into the float chamber 13 in the normal course of operation must first displace the air therein; consequently, only a minimum volume of liquid may enter. A rubber seal 20 is provided between the tie rod 19 and rod hole to prevent any water which may enter the ports 12 from displacing the air through this aperture. Washer 25 is disposed between the rubber seal 20 and the tie rod shoulder 26. In addition to maintaining the seal 20 in proper sealing relationship with the float 11, shoulder 25 also enables the flanged nut 17 to compress seal 15 imparting a curved configuration thereto, while flanged nut 18 may hold liquid inlet disc 16 in a relatively loose manner. It is, of course, apparent that the plastic float 11 may be molded with the rod 19 positioned thereon eliminating the need of the rubber seal 20.

The slight amount of water which may enter the float chamber 13 readily drains out upon cessation of the inlet flow at which time the sealing disc 16 of float 11 seats on the inlet seat 14 which may be removable as shown or integral with the casing.

Resilient sealing discs 15 and 16 are attached to opposite end surfaces of the float 11. Disc 15 is firmly attached to the top surface 23 of the float by means of the flanged nut 17. The compressive action of the nut creates stresses in the resilient disc 15 thereby imparting an inverted cone configuration to the disc and increasing its resilient quality. The disc 15, however, will still work to substantial advantage if lying flat on the upper surface 23 of the float.

The seating disc 16, however, is loosely attached to the bottom of the float 11 by means of the flanged nut 18. The loose nature of the attachment enables the flexible disc to envelope any foreign substance or particle that may lodge on the periphery of the seat 14, thereby maintaining a fluid seal despite the imperfect nature of the fluid inlet seating surface.

The tie rod 19 maintains the bottom of the float 21 and the sealing discs 15 and 16 in fixed relation to the remainder of the float. However, cement or other suitable means of attachment may be substituted if so desired in maintaining the component parts of the float 11 together.

Particular attention will now be given to the atmospheric inlet seat 22 which is annularly relieved so as to form a frusto-conical depression, and the top surface 23 of the float member 11 which is chamfered about its outer edge resulting in a relieved portion under the outer periphery of the sealing disc 15. The angle of this outer chamfered edge and the angle of elevation of the sides of the relieved portion of the atmospheric inlet seat are substantially the same. When fluid entering the inlet 2 impinges against the bottom sealing disc 16 the light plastic float body 11 is impelled upwards, thereby forcing the atmospheric sealing disc 15 into contact with the atmospheric inlet seat 22.

The seat 22 is suitably formed as shown in Fig. 1 so as to enable the sealing disc 15 to effect a line bearing upon initial contact. This initial line contact will be maintained during low rates of fluid flow. Whereas the flanged nut 17 placed sealing disc 15 under stress, the periphery of the disc, having a high resilient quality, will maintain an efficient seal at low rates of flow, the slight seal cone flexing with the changes in flow rate. While a sharp edge is depicted on the periphery of the seat 22, it is, of course, apparent that a convex surface will effect a line bearing to similar advantage.

Upon an increase in fluid pressure resulting from an increase in fluid flow through the inlet 2, the periphery of the sealing disc 15 will be forced tighter against the seat 22 until a critical pressure is reached whereupon the disc periphery will buckle and be forced up the sides of the frusto-conical recess, forcing or wiping all foreign matter from the sealing surface before it. The chamfered surface 23 of the float member 11 which is the immediate driving surface, by virtue of its frusto-conical configuration is enabled to proceed up the sides of the seat recess with which it conforms forcing the constantly flexing disc 15 before it.

Thus, it will be apparent that as the pressure increases the disc 15 proceeds further and further up the frusto-conical recess concomitantly providing a sealing contact of increasingly greater area. The limit of said upward movement is reached when the chamfered float surface 23 is unable to proceed any further into the frusto-conical recess of the valve seat 22. It is, of course, obvious that the feature of increased area contact with increased pressures preserves the life of the disc since wear is distributed over a larger area and not concentrated on line or bearings of small area contact.

It will be further appreciated that when the float 11 is utilized to prevent the back siphonage of material in the outlet upon the occurrence of a vacuum in the inlet 2, the sealing disc 15 will quickly and efficiently disengage from the atmospheric inlet seat 22 because of the tendency for the distorted disc to revert to its natural configuration when not under pressure. Consequently, there is no fear of sticking regardless of how long the disc 16 has remained in the seated position. A reduction or cessation of fluid pressure will immediately enable the distorted disc to "peel" out of the conical recess at a speed dependent upon the nature of the pressure decrease. The withdrawal of the disc can be gradual if the pressure drop is gradual, or instantaneous if the fluid flow is suddenly stopped, thus assuring an efficient fluid seal by the sealing disc 16 on the fluid inlet seat 14 in sufficient time to prevent any back siphonage into the inlet 2.

Upon satisfying the vacuum in the chamber 6 by an influx of air through the vent passage 4, and resumption of fluid flow, fluid pressure will once more force the float 11 upwards causing the disc 15 to once more engage the atmospheric valve seat 22. Any water which may have entered the float immediately drained through the float ports 12 upon seating of the float 11 on the inlet valve seat 14, assuring a light buoyant air-filled body when flow was resumed.

Thus, it will be apparent that we have devised a simple and economical valve construction possessing advantages long sought after in the art. The ability of a float member to maintain a fluid seal at the atmospheric entrance at low rates of flow had heretofore been difficult or impossible in valve constructions of this type. The novel design of our valve seat and float member surface provides a fluid-tight seal even at the lowest rates of flow. A self-cleaning valve embodied in our invention wherein a flexible sealing disc wipes a rigid seating surface free from foreign matter and thereby assures an efficient fluid-tight seal that has heretofore been unknown in the art.

It will also be apparent that a variety of constructions are available within the spirit of our invention, and we desire therefore to be limited only by the scope of the appended claims.

We claim:

1. A valve member comprising a pair of oppositely disposed resilient sealing discs, a buoyant hollow float of substantially cylindrical configuration, said float having a removable bottom, said float also being apertured at both end limits for the insertion of a tie rod, said tie rod having a shoulder disposed in the proximity of one end limit, a rubber seal on the float positioned between said tie-rod shoulder and the underside of said upper float surface whereby the float tie-rod aperture is rendered air tight, a flanged nut engaged to the upper end limit of said tie rod, one of said resilient sealing discs being positioned between said flanged nut and said float upper end limit, the compressive action of said nut inducing an inverted cone configuration in said resilient disc, the reaction in said compressive nut action being effected between the tie-rod shoulder and the underside of said float upper end limit, the other of said resilient sealing discs being positioned between the removable bottom of said float and a flanged nut engaged to the lower end limit of said tie rod.

2. The subject matter of claim 1 in combination with a valve casing having a liquid inlet at a lower portion thereof and valve seat therefor within the casing, a liquid outlet on a side of the casing, an atmospheric inlet and valve seat therefor at an upper portion of the said casing, a bonnet member on the casing, and a vent cap cooperating with the bonnet member above the atmospheric inlet, the said float being movable in the casing to alternately make contact at the liquid inlet with the said casing liquid inlet valve seat and the said bonnet member at respective opposite end limits of movement thereof.

3. In a valve of the character described, the combination comprising a casing having a liquid inlet at a lower portion thereof and a valve seat therefor in said casing, an atmospheric inlet and valve seat therefor at an upper portion of the casing, a liquid outlet on a side wall extending from said casing, a float member reciprocally movable in said casing, said atmospheric inlet valve seat being annularly recessed in the configuration substantially of a cone frustrum, the upper end limit of said float member opposite said cone frustrum configuration being annularly chamfered on an outer peripheral corner portion to form thereon a surface of substantially frusto-conical configuration, the outer limit of said cone frustrum configuration being defined by a vertically extending annular surface intersecting the said cone frustrum surface to form a sharp outer annular edge on a lower peripheral limit of said atmospheric inlet valve seat, a resilient disc affixed to the upper end limit of said float member, said resilient disc being interposed between the lower unit of said atmospheric valve seat and the upper end limit of said float member with its central portion supported on said float member and with its outer peripheral portion overlying the annular chamfer of the said float member, the lower end limit of said atmospheric inlet seat defined by said sharp outer annular edge slidably engaging an annular outer peripheral area of said resilient disc at a stage approaching the upper end limit of movement of said float member whereby the overlying outer peripheral portion of the said disc is deflected downwardly over the chamfered portion of the said float member and whereby during the said deflection and the slidable engagement of the said disc by said seat, foreign matter or the like on the annular peripheral slidably engaged area of said disc will be wiped or scraped therefrom preliminary to the actual sealing engagement taking place between said resilient disc outer peripheral area and said atmospheric valve seat at the upper limit of movement of said float member.

References Cited in the file of this patent

UNITED STATES PATENTS

| | | |
|---|---|---|
| 2,133,804 | Brooks | Oct. 18, 1938 |
| 2,209,189 | Callejo | July 23, 1940 |
| 2,252,164 | Cantor | Aug. 12, 1941 |
| 2,299,706 | Svirsky | Oct. 20, 1942 |
| 2,325,956 | Holtman | Aug. 3, 1943 |
| 2,332,695 | Cantor | Oct. 26, 1943 |
| 2,655,171 | Cantor | Oct. 13, 1953 |

FOREIGN PATENTS

| | | |
|---|---|---|
| 660,696 | Great Britain | Nov. 14, 1951 |